(12) United States Patent
Bailey

(10) Patent No.: US 8,320,662 B2
(45) Date of Patent: Nov. 27, 2012

(54) DISTINGUISHING COLORS OF ILLUMINATED OBJECTS USING MACHINE VISION

(75) Inventor: Michael Bailey, Newbury (GB)

(73) Assignee: National Instruments Corporation, Austin, TX (US)

( * ) Notice: Subject to any disclaimer, the term of this patent is extended or adjusted under 35 U.S.C. 154(b) by 996 days.

(21) Appl. No.: 12/350,034

(22) Filed: Jan. 7, 2009

(65) Prior Publication Data

US 2010/0172573 A1      Jul. 8, 2010

(51) Int. Cl.
*G06K 9/62* (2006.01)
*G06K 9/34* (2006.01)
*G06K 9/00* (2006.01)
*G06K 9/40* (2006.01)

(52) U.S. Cl. ........ 382/162; 382/159; 382/164; 382/167; 382/274

(58) Field of Classification Search .................. None
See application file for complete search history.

(56) References Cited

U.S. PATENT DOCUMENTS

| | | | | |
|---|---|---|---|---|
| 5,745,178 A * | 4/1998 | Hartung et al. | ........... | 375/240.04 |
| 6,317,510 B1 * | 11/2001 | Murakami | ..................... | 382/132 |
| 6,594,388 B1 * | 7/2003 | Gindele et al. | ................. | 382/167 |
| 7,130,454 B1 * | 10/2006 | Berube et al. | ................. | 382/118 |
| 7,334,901 B2 * | 2/2008 | El-Ghoroury | ..................... | 353/94 |
| 7,436,997 B2 * | 10/2008 | Ishigami et al. | .............. | 382/167 |
| 7,783,117 B2 * | 8/2010 | Liu et al. | ....................... | 382/232 |
| 7,841,722 B2 * | 11/2010 | Miyazawa et al. | .............. | 353/69 |
| 7,860,309 B1 * | 12/2010 | Bodnar et al. | ................. | 382/173 |
| 7,948,499 B2 * | 5/2011 | Ramanath et al. | ............ | 345/581 |
| 8,077,185 B2 * | 12/2011 | Selbrede et al. | .............. | 345/589 |
| 8,224,045 B2 * | 7/2012 | Burns et al. | ..................... | 382/128 |
| 2002/0110372 A1 * | 8/2002 | Fields | ........................... | 396/225 |
| 2003/0099397 A1 * | 5/2003 | Matsugu et al. | .............. | 382/173 |
| 2004/0002023 A1 * | 1/2004 | Sowinski | ...................... | 430/505 |
| 2004/0056596 A1 * | 3/2004 | Iguchi et al. | .................. | 313/582 |
| 2004/0151364 A1 * | 8/2004 | Kenneway et al. | ........... | 382/152 |
| 2004/0170337 A1 * | 9/2004 | Simon et al. | .................. | 382/254 |
| 2004/0206882 A1 * | 10/2004 | Banks et al. | ............... | 250/201.2 |
| 2005/0002260 A1 * | 1/2005 | Koyama | ........................ | 365/222 |
| 2005/0052533 A1 * | 3/2005 | Ito et al. | ......................... | 348/169 |
| 2005/0240860 A1 * | 10/2005 | Gohara et al. | ............. | 715/500.1 |

(Continued)

OTHER PUBLICATIONS

Beatriz Díaz Acosta; "Experiments in Image Segmentation for Automatic US License Plate Recognition"; Blacksburg, Virginia; Jun. 18, 2004; 104 pages.

(Continued)

*Primary Examiner* — Michelle Entezari

(74) *Attorney, Agent, or Firm* — Meyertons Hood Kivlin Kowert & Goetzel, P.C.; Jeffrey C. Hood; Mark S. Williams

(57) ABSTRACT

System and method for distinguishing colors of illuminated objects using machine vision. A color-balanced image that includes at least one lit area is received, as well as an indication of a region of interest that includes one of the one or more lit areas. A mask image is generated based on the region of interest. A color-balanced image of the region of interest is generated by masking the color-balanced image with the mask image, and a plurality of image attributes for the region of interest is determined by analyzing the color-balanced image of the region of interest. A color is determined based on the plurality of image attributes using a trained classifier, and the determined color stored, e.g., in a memory medium.

25 Claims, 13 Drawing Sheets

U.S. PATENT DOCUMENTS

2007/0013772 A1* 1/2007 Tham et al. .................... 348/87
2007/0140556 A1* 6/2007 Willamowski et al. ....... 382/167
2007/0189615 A1* 8/2007 Liu et al. ....................... 382/232
2008/0060652 A1* 3/2008 Selvarajan et al. ...... 128/206.21
2008/0075360 A1* 3/2008 Li et al. ......................... 382/155
2008/0107341 A1* 5/2008 Lu ................................. 382/190
2008/0285849 A1* 11/2008 Lu et al. ........................ 382/166
2009/0132938 A1* 5/2009 Gardner et al. ............... 715/762
2009/0141937 A1* 6/2009 Abe ............................... 382/103
2009/0222388 A1* 9/2009 Hua et al. ........................ 706/12
2012/0129605 A1* 5/2012 Livet et al. ...................... 463/39

OTHER PUBLICATIONS

Marcel J. Castro; "Color Image Classification"; Computing Research Conference; Dec. 4, 1999; 4 pages.
Gary Mavko; "Seismic and Rockphysics Diagnostics of Multiscale Reservoir Textures"; Apr. 2005; 20 pages.

\* cited by examiner extracted intensity image
(gray scale)

binarised image

*binarised and mask image combined* original image with combined mask applied

DISTINGUISHING COLORS OF ILLUMINATED OBJECTS USING MACHINE VISION

FIELD OF THE INVENTION

The present invention relates to the field of machine vision, and more particularly to distinguishing between colors of illuminated objects.

DESCRIPTION OF THE RELATED ART

Many modern appliances or devices contain colored lights (e.g., colored LEDs) to signify different states of operation or warnings. While plainly clear to the naked eye these colored lights (and/or color-illumined areas) are often not distinguishable to a machine vision system. For example, yellow, amber, orange, and red symbols on a car dashboard may all appear to a machine vision system to be the same color. This problem may be further compounded if the illuminated areas are of different shapes and sizes.

For example, determining the color of lit LEDs on a dashboard display has historically been a very difficult task due to the shape of the symbols (e.g., physical masks) through which the LED's shine. As each symbol has a different shape when a histogram is applied to it, it can give differing results for the same LED color with the same region of interest. This particular application is further complicated by the material used to make the dashboard, as this acts as a diffuser, scattering the light. In other applications of lit area color determination, e.g., checking the colors of LEDs on a circuit board, other problems come into play. For example, if the LEDs are not surface mount then their angle with regards to the circuit board, and more importantly to the camera, becomes critical. The LED does not give a consistent color throughout its entire body and the lensing effect of the shape will make the lit area move within an image as the angle of the LED with respect to the camera changes. This also affects the shape of the lit area and therefore the same problem is encountered as before, where the same LED can produce different histograms when viewed from a different angle.

Thus, improved systems and methods for distinguishing colors of illuminated objects using machine vision are desired.

SUMMARY OF THE INVENTION

Various embodiments of a system and method for distinguishing between colors of illuminated (lit) objects are presented below.

First, a color-balanced image that includes at least one lit area may be received. Being color-balanced means that a white area in the image has substantially equal red, green and blue components, e.g., substantially equal R, G, and B values, per the well-known RGB color model. Note that "substantially equal" as used herein means that the values are equal within some specified tolerance. For example, in one exemplary embodiment, the values may be within 1% of each other. In other embodiments, the values may be within other percentages of one another, e.g., within 5%, within 10%, and so forth as desired, for example, depending upon the application.

The image may originate from any of a variety of sources. For example, in one embodiment of an industrial application, the image may be produced and acquired by a vision system, where an industrial camera takes a picture of an object, e.g., on a manufacturing assembly line, and sends the image data to a computer system, where in some embodiments, the image may be processed as described herein, or, in other embodiments, the image may be sent to some other computer, e.g., over a network, for processing. Note that if the original image is not color-balanced, the image may be processed to balance the colors.

An indication of a region of interest may be received, where the region of interest includes one of the one or more lit areas. In other words, a portion of the image may be specified or indicated, e.g., via user input or programmatically. For example, in one embodiment, a user may specify the region of interest (ROI) by dragging a mouse over a display of the image. In another embodiment, an image analysis program may be used to programmatically detect and localize or indicate the ROI. The particular manner in which the ROI is indicated is not important, i.e., any approach may be used as desired.

A mask image may be generated based on the ROI. For example, the mask image may be created by setting every pixel value within the region of interest to white and every other pixel to black. Thus, the mask image implements a "window" corresponding to the ROI, where the rest of the image is obscured. In one embodiment, generating the mask image based on the region of interest may include generating a binary image from the color-balanced image, e.g., by generating a grayscale image from the color-balanced image, and generating the binary image from the grayscale image based on a specified threshold.

For example, an initial mask image may be generated based on the region of interest, then, the mask image may be generated based on the initial mask and the binary image. In other words, in one embodiment, a grayscale intensity (e.g., luminosity or luminance) image may be extracted from the color image. The grayscale image may then be thresholded to provide a binary, e.g., black and white, image. The binary image and the initial mask image may then be combined, e.g., ANDed, to generate the mask image.

A color-balanced image of the region of interest may be generated by masking the color-balanced image with the mask image. In other words, the original (color-balanced) image may be masked with the thresholded image, e.g., resulting in only the interesting color area (the ROI) of the color-balanced image remaining and the rest of the image being set to black. FIG. 11 illustrates an exemplary color-balanced image of the region of interest generated from the images of FIGS. 7 and 10. Note that the non-black part of the image is that portion of the color-balanced image of FIG. 7 defined or specified by the ROI. Thus, the above method elements may generate an isolated ROI of the color-balanced image that is suitable for color analysis.

A plurality of image attributes for the region of interest may be determined by analyzing the color-balanced image of the region of interest. For example, in one embodiment, analyzing the color-balanced image of the region of interest may include computing a histogram on the color-balanced image of the region of interest, and determining the plurality of attributes based on the histogram. In some embodiments, the plurality of image attributes for the region of interest may include attributes with respect to multiple color planes. For example, the image attributes may include average value, minimum value, maximum, and standard variation for each of red, green, blue, hue, saturation, and intensity color planes. In other words, the average value, minimum value, maximum, and standard variation may be determined for both the RGB (Red, Green, Blue) color planes, and the HSI (Hue, Saturation, and Intensity) color planes. It should be noted, however, that in other embodiments, other color models/color planes may be used as desired.

Thus, in one embodiment, a histogram may be produced with respect to the color-balanced image of the region of interest, and based on the histogram, the average value, the minimum value, the maximum value and the standard variation determined for each of the red, green and blue color planes, and the same operation may be carried out with respect to the HSI (hue, saturation and intensity) color planes, thus producing 24 values that characterize the color-balanced image of the region of interest. Note, however, that in other embodiments, other attributes may be determined as desired.

A color may be determined based on the plurality of image attributes using a trained classifier. More specifically, the determined attribute values may be provided to the trained classifier as input, and the classifier may return a color classification for the (color-balanced image of the) ROI. Moreover, in one embodiment, determining the color may further include determining a confidence value for the color using the trained classifier. The confidence value may indicate a degree to which the determined color matches the color of the lit area in the region of interest. Thus, while the classifier may always determine a color, the confidence value, i.e., the measure of how good the color classification is, may be used to determine if the classification is valid, or, conversely, if an invalid color has been detected.

The determined color, i.e., the color classification, may be stored. Note that the color classification may be used for any of a variety of purposes. For example, in one exemplary embodiment, the image includes an image of an object, e.g., a manufactured object to be tested for quality assurance, where the image is received from an image acquisition device in an industrial process. The determined color may then be used to analyze the object. More generally, the determined color(s) may be used in any manner and for any applications desired. For example, in some embodiments, the method may further include performing one or more operations with respect to the object based on the analysis of the object, e.g., indicating or removing the object if it fails to meet quality requirements, etc., as desired.

BRIEF DESCRIPTION TO THE DRAWINGS

A better understanding of the present invention can be obtained when the following detailed description of the preferred embodiment is considered in conjunction with the following drawings, in which.

Figure 1A:
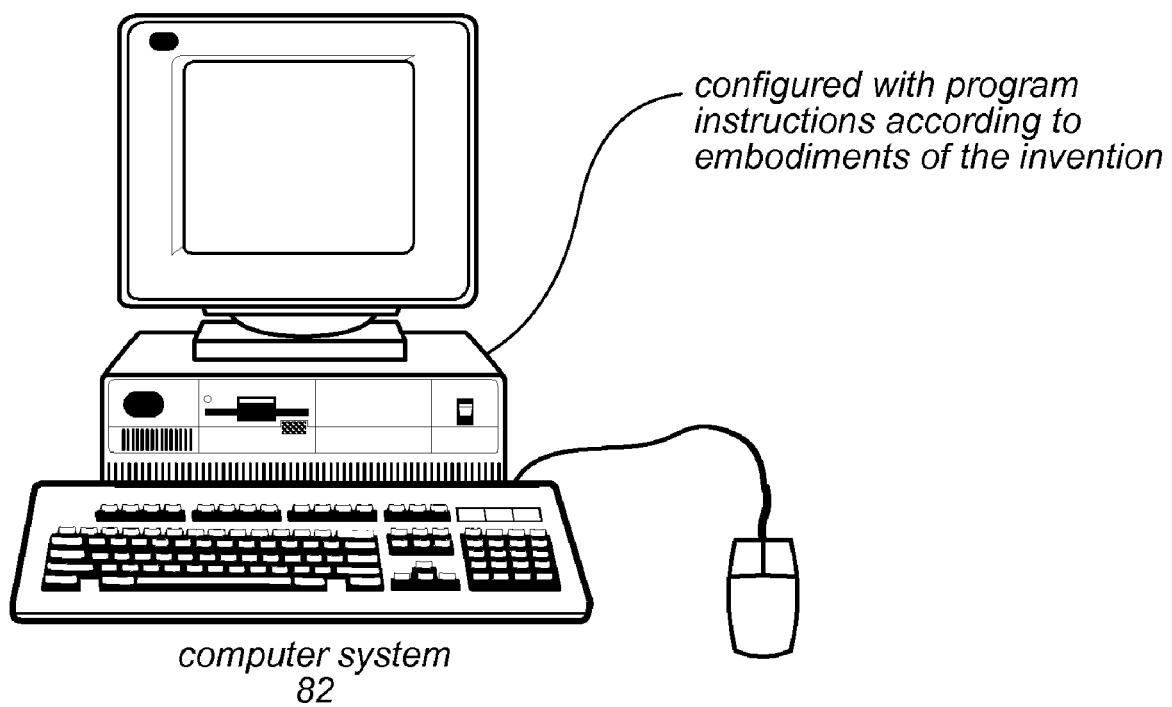
FIG. 1A illustrates a computer system configured to implement embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference

The following references are hereby incorporated by reference in their entirety as though fully and completely set forth herein:

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Patent Application Publication No. 20010020291 (Ser. No. 09/745,023) titled "System and Method for Programmatically Generating a Graphical Program in Response to Program Information," filed Dec. 20, 2000.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, PASCAL, FORTRAN, COBOL, JAVA, assembly language, etc.; graphical programs (programs written in graphical programming languages); assembly language programs; programs that have been compiled to machine language; scripts; and other types of executable software. A software program may comprise two or more software programs that interoperate in some manner. Note that various embodiments described herein may be implemented by a computer or software program. A software program may be stored as program instructions on a memory medium.

Hardware Configuration Program—a program, e.g., a netlist or bit file, that can be used to program or configure a programmable hardware element.

Graphical Program—A program comprising a plurality of interconnected nodes or icons, wherein the plurality of interconnected nodes or icons visually indicate functionality of the program. Graphical function nodes may also be referred to as blocks.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW®, DasyLab™, DiaDem™ and Matrixx/SystemBuild™ from National Instruments, Simulink® from the MathWorks, VEE™ from Agilent, WiT™ from Coreco, Vision Program Manager™ from PPT Vision, SoftWIRE™ from Measurement Computing, Sanscript™ from Northwoods Software, Khoros™ from Khoral Research, SnapMaster™ from HEM Data, VisSim™ from Visual Solutions, ObjectBench™ by SES (Scientific and Engineering Software), and VisiDAQ™ from Advantech, among others.

The term "graphical program" includes models or block diagrams created in graphical modeling environments, wherein the model or block diagram comprises interconnected blocks (i.e., nodes) or icons that visually indicate operation of the model or block diagram; exemplary graphical modeling environments include Simulink®, SystemBuild™, VisSim™, Hypersignal Block Diagram™, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected blocks or nodes are often referred to as the block diagram portion of the graphical program.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes, terminal nodes, structure nodes, etc. Nodes may be connected together in a graphical program by connection icons or wires.

Graphical Data Flow Program (or Graphical Data Flow Diagram)—A graphical program or diagram comprising a plurality of interconnected nodes (blocks), wherein at least a subset of the connections among the nodes visually indicate that data produced by one node is used by another node. A LabVIEW VI is one example of a graphical data flow program. A Simulink block diagram is another example of a graphical data flow program.

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a graphical program. In this instance, various mechanisms may be used to connect GUI Elements in the GUI with nodes in the graphical program. For example, when Input Controls and Output Indicators are created in the GUI, corresponding nodes (e.g., terminals) may be automatically created in the graphical program or block diagram. Alternatively, the user can place terminal nodes in the block diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program, and view output of the program, while the program is executing.

A front panel is a type of GUI. A front panel may be associated with a graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators.

Input Control—a graphical user interface element for providing user input to a program. An input control displays the value input the by the user and is capable of being manipulated at the discretion of the user. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Subset—in a set having N elements, the term "subset" comprises any combination of one or more of the elements, up to and including the full set of N elements. For example, a subset of a plurality of icons may be any one icon of the plurality of the icons, any combination of one or more of the icons, or all of the icons in the plurality of icons. Thus, a subset of an entity may refer to any single element of the entity as well as any portion up to and including the entirety of the entity.

Color Balance—color balance (sometimes called gray balance, neutral balance, or white balance) refers to the adjustment of the relative amounts of red, green, and blue primary colors in an image such that neutral colors are reproduced correctly. Color balance changes the overall mixture of colors in an image and is used for generalized color correction.

Grayscale—a grayscale or greyscale digital image is an image in which the value of each pixel is a single sample, that is, it carries the full (and only) information about its intensity. Images of this sort are composed exclusively of shades of neutral gray, varying from black at the weakest intensity to white at the strongest.

Histogram—a color histogram is a representation of the distribution of colors in an image, derived by counting the number of pixels of each of given set of color ranges in a typically two-dimensional (2D) or three-dimensional (3D) color space.

HSI (Hue, Saturation, Intensity)—a color model often used as an alternative to the RGB (Red, Green, Blue) color model. HSL (Hue, Saturation, Lightness) and HSV (Hue, Saturation, Value) are two related representations of points in an RGB color space, which attempt to describe perceptual color relationships more accurately than RGB, while remaining computationally simple.

Masked—a BIT-wise AND of images, where 0 AND x=0, and 1 AND x=x.

ROI—A Region of Interest, a selected subset of samples within a dataset identified for a particular purpose.

Thresholded—During a thresholding process, individual pixels in an image are marked as "object" pixels if their value is greater than some threshold value (assuming an object to be brighter than the background) and as "background" pixels otherwise.

FIG. 1A—Computer System

FIG. 1A illustrates a computer system 82 configured to implement an embodiment of the present invention. One embodiment of a method for the determination of color of a contrasting area of an image is described below.

As shown in FIG. 1A, the computer system 82 may include a display device operable to display information or elements related to the method described below. For example, the display device may be used to display, create, and/or edit, software implementing embodiments of the method. The display device may also be operable to display a graphical user interface of the program during execution of the program. The graphical user interface may comprise any type of graphical user interface, e.g., depending on the computing platform.

In some embodiments, the present invention may be implemented in software. Thus, the computer system 82 may include at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs, e.g., the LabVIEW™ graphical program development environment, provided by National Instruments Corporation. The memory medium may also store operating system software, as well as other software for operation of the computer system. Various embodiments further include receiving or storing instructions and/or data implemented in accordance with the foregoing description upon a carrier medium.

Figure 1B:
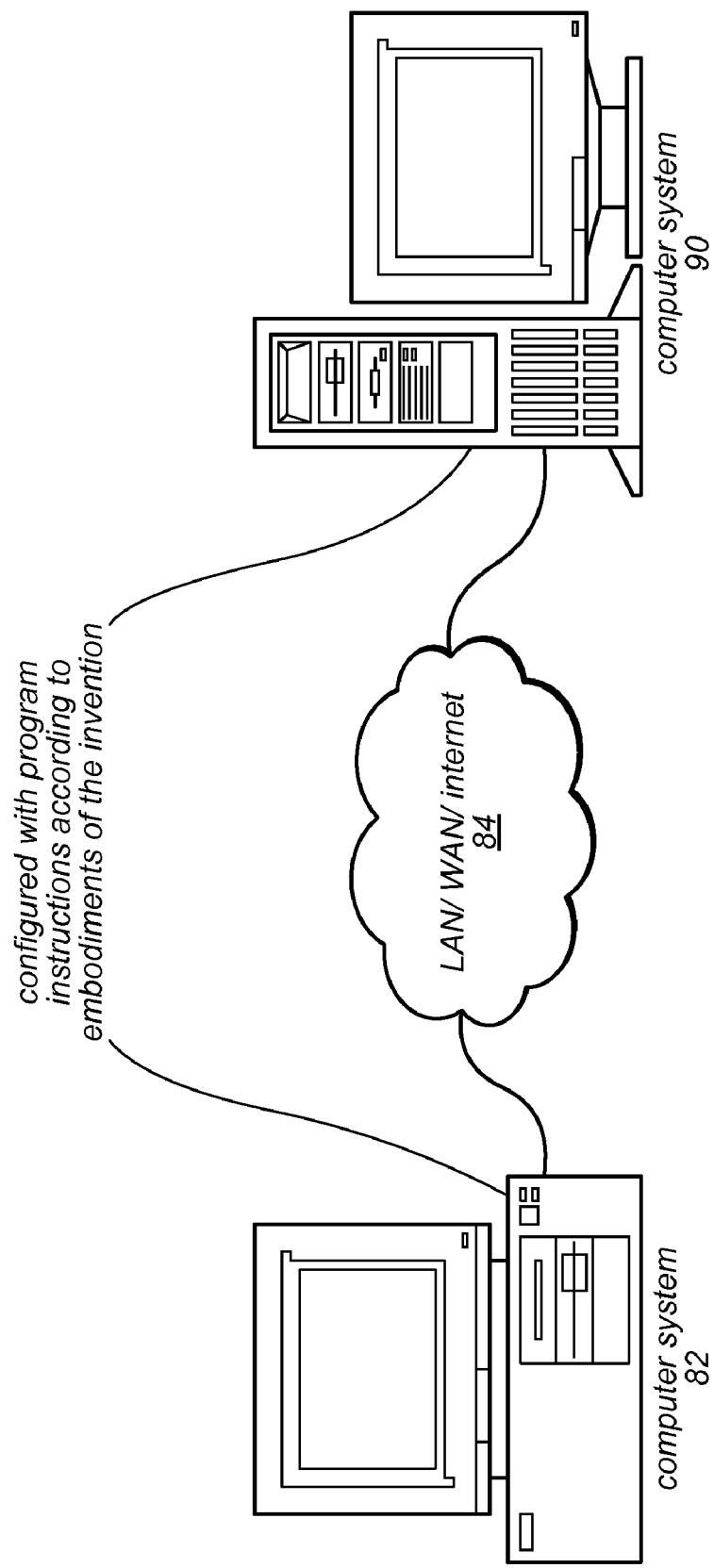
FIG. 1B illustrates a network system comprising two or more computer systems that implement an embodiment of the present invention.

FIG. 1B—Computer Network

FIG. 1B illustrates a system including a first computer system 82 that is coupled to a second computer system 90. The computer system 82 may be coupled via a network 84 (or a computer bus) to the second computer system 90. The computer systems 82 and 90 may each be any of various types, as desired. The network 84 can also be any of various types, including a LAN (local area network), WAN (wide area network), the Internet, or an Intranet, among others. The computer systems 82 and 90 may execute a program, e.g., a graphical program, in a distributed fashion. For example, in embodiments where the program is a graphical program, computer 82 may execute a first portion of the block diagram of a graphical program and computer system 90 may execute a second portion of the block diagram of the graphical program. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system. Of course, in other embodiments, the program(s) may be of any type desired, e.g., a text-based program written in C, C++, PASCAL, FORTRAN, JAVA, etc.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others. Other applications contemplated include surveillance and security, scientific image analysis, and graphic arts, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
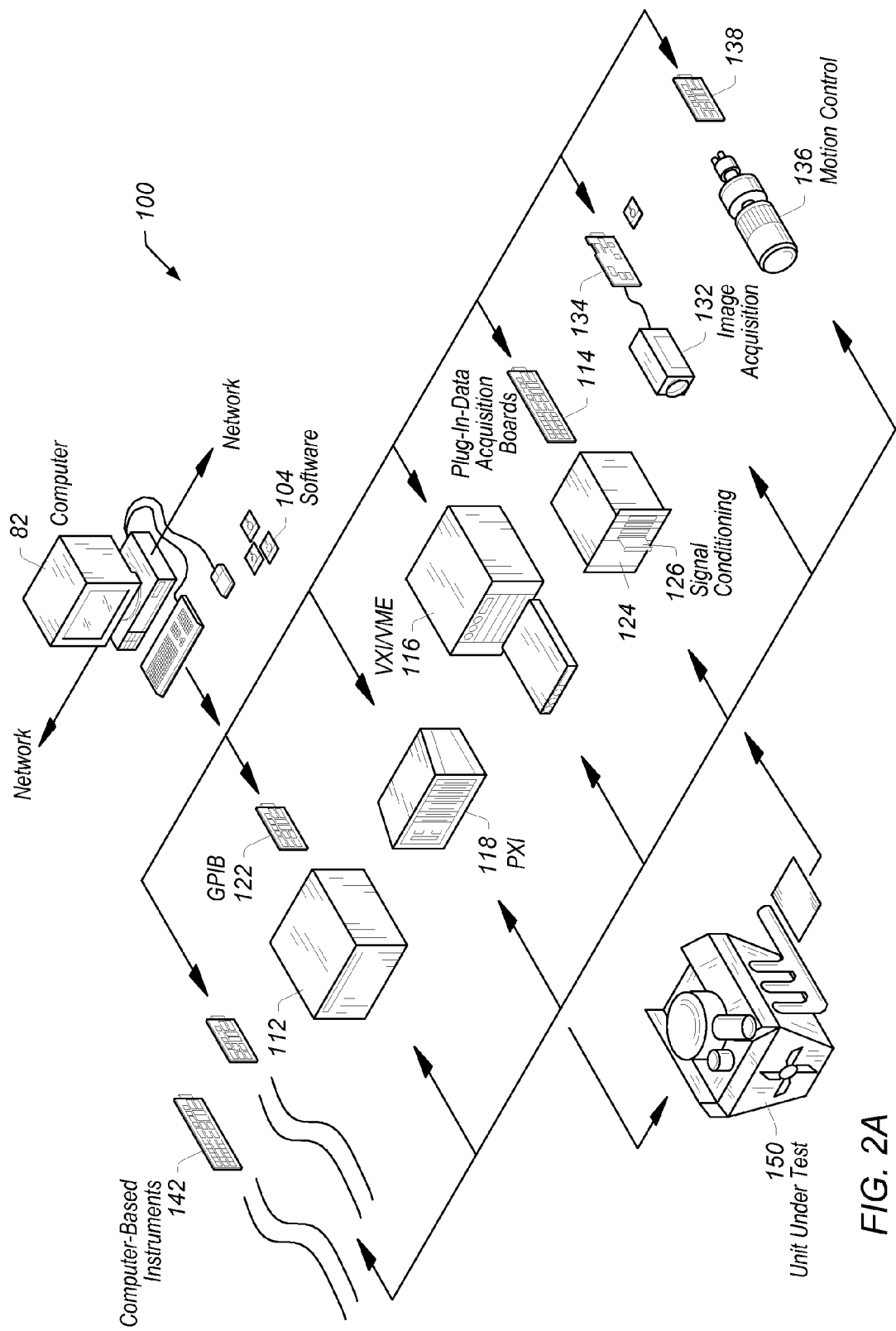
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others, as indicated above.

Figure 2B:
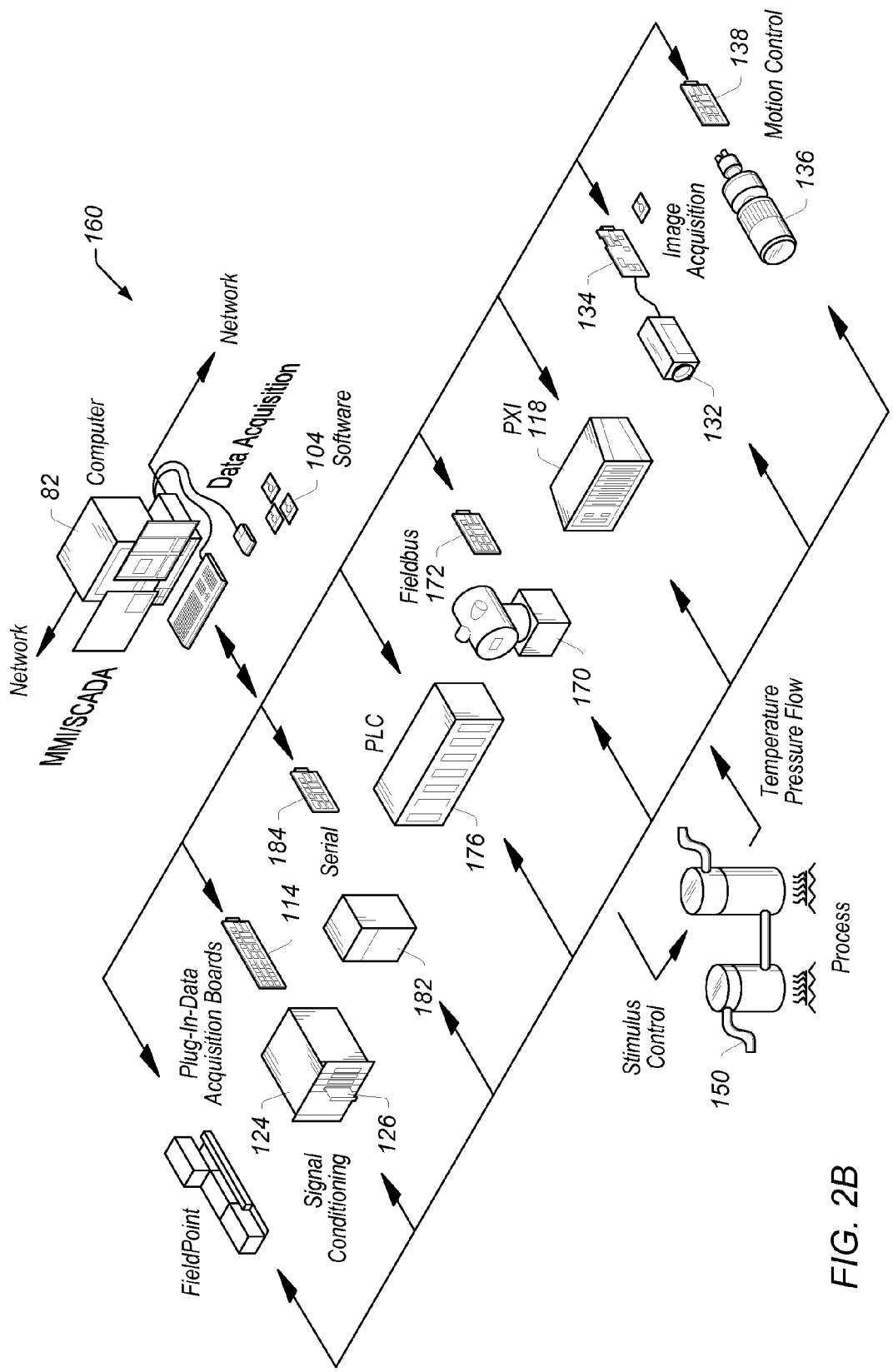
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to perform an automation function with respect to a process or device 150, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
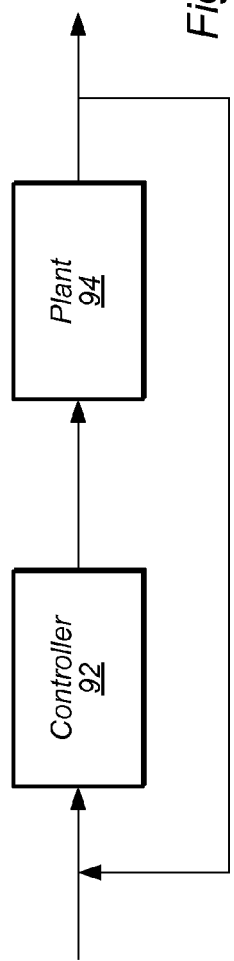
FIG. 3A is a high level block diagram of an exemplary system which may utilize embodiments of the present invention.

FIG. 3A is a high level block diagram of an exemplary system which may execute or utilize programs according to embodiments of the present invention. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a program, e.g., a graphical program, that specifies or implements the functionality of one or both of the controller 92 and the plant 94. For example, a control engineer may use a modeling and simulation tool to create a model (program) of the plant 94 and/or to create the algorithm (program) for the controller 92.

Figure 3B:
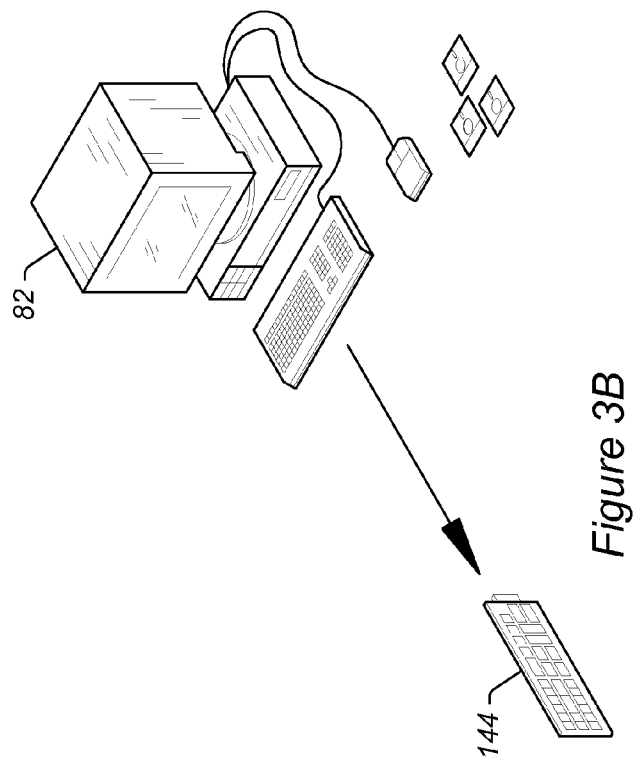
FIG. 3B illustrates an exemplary system which may perform control and/or simulation functions utilizing embodiments of the present invention.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a program. In a similar manner, the plant 94 may be implemented by a computer system or other device 144 (e.g., including a processor and memory medium and/or including a programmable hardware element) that executes or implements a program, or may be implemented in or as a real physical system, e.g., a car engine.

In one embodiment of the invention, one or more programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a program, and the program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a program. Thus the user may create a program on a computer and use (execute) the program on that computer or deploy the program to a target device (for remote execution on the target device) that is remotely located from the computer and coupled to the computer through a network. As noted above, in some embodiments, software implementing an embodiment of the present invention may include graphical programs.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
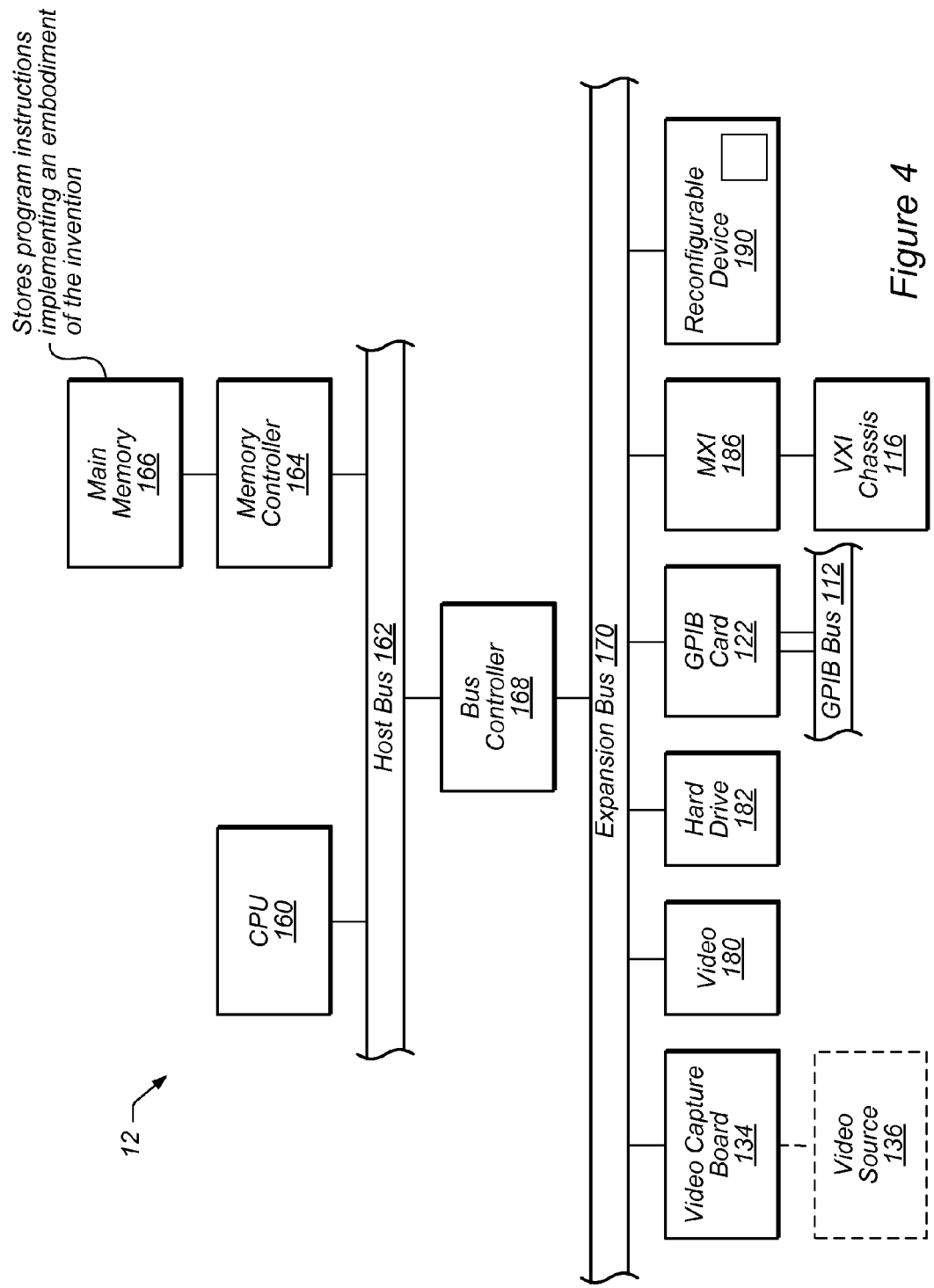
FIG. 4 is a high-level diagram of a computer system configured to perform image acquisition and color analysis, according to one embodiment.

FIG. 4—Computer System Block Diagram

FIG. 4 is a block diagram representing one embodiment of the computer system 82 and/or 90 illustrated in FIGS. 1A and 1B, or computer system 82 shown in FIG. 2A or 2B. It is noted that any type of computer system configuration or architecture can be used as desired, and FIG. 4 illustrates a representative PC embodiment. It is also noted that the computer system may be a general purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store program instructions, e.g., software programs, executable to implement or perform embodiments of the present invention. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a program to the device 190 for execution of the graphical program on the device 190. In embodiments where the program is a graphical program, the deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
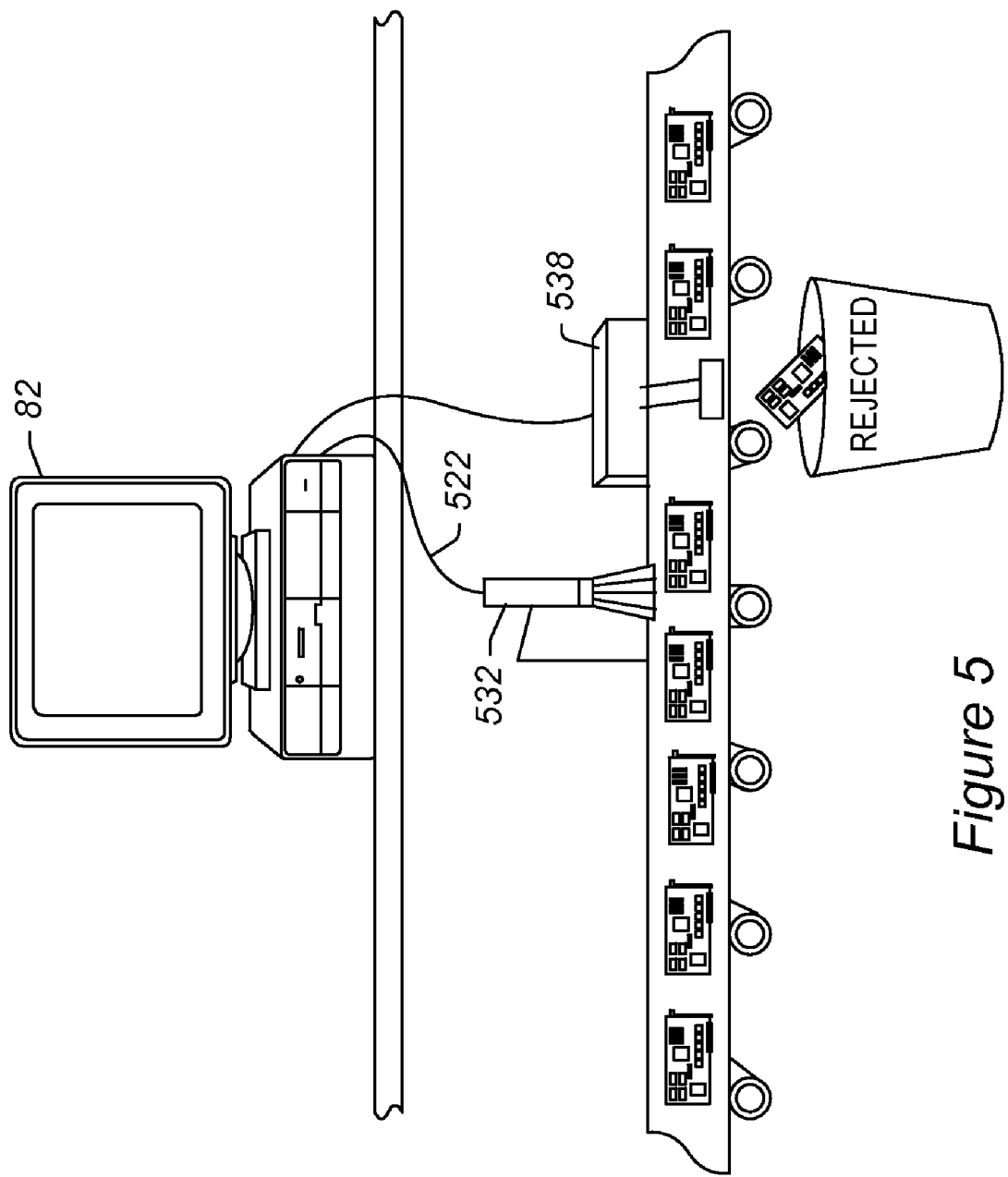
FIG. 5 illustrates an image acquisition (video capture) system for acquiring images, according to one embodiment.

FIG. 5—Industrial Vision System

FIG. 5 illustrates an exemplary industrial vision system, e.g., for inspection/control, including a vision system that includes a computer system 82 and a camera 512, as well as a control device 538 coupled to the computer via a transmission medium 522, e.g., a network. As indicated, in this exemplary industrial application, manufactured parts (objects) are conveyed past the camera 512, which acquires an image of each part. Each image is analyzed (e.g., by the computer 82), and a determination is made as to whether the part passes inspection. If not, commands are sent to the control device 538 to remove the part from the conveyor. Embodiments of the present invention may be used in such a system to analyze the acquired images, and possibly perform operations with respect to imaged objects, e.g., indicating and/or removing objects that fail inspection, etc.

Figure 6:
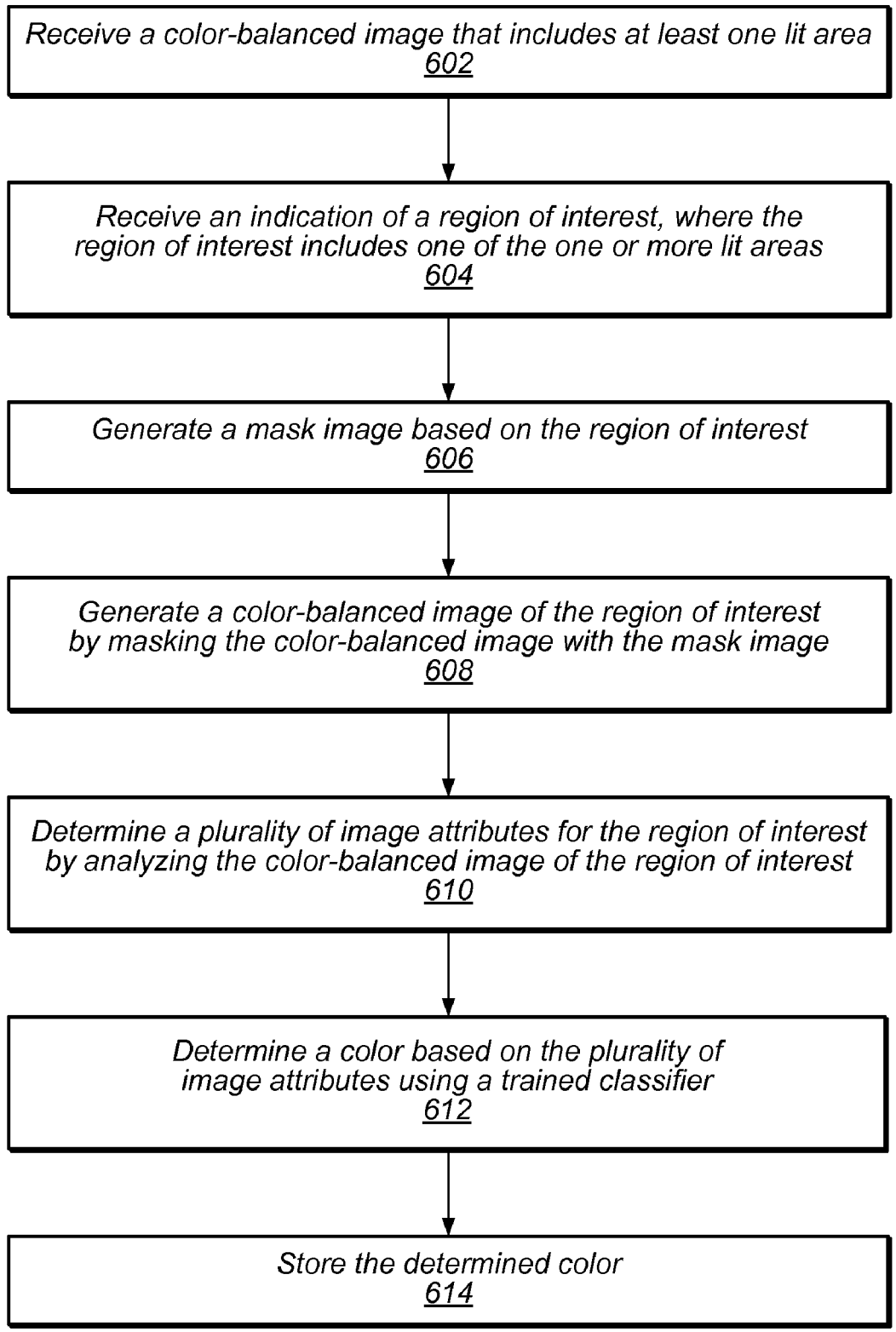
FIG. 6 is a flowchart of a method for performing color analysis, according to one embodiment.

FIG. 6—Flowchart of a Method for Performing Color Analysis

FIG. 6 illustrates a method for performing color analysis. More specifically, FIG. 6 illustrates a method for distinguishing between colors of illuminated objects, according to one embodiment. The method shown in FIG. 6 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 602, a color-balanced image that includes at least one lit area may be received. Being color-balanced means that a white area in the image has substantially equal red, green and blue components, e.g., substantially equal R, G, and B values, per the well-known RGB color model. Note that "substantially equal" as used herein means that the values are equal within some specified tolerance. For example, in one exemplary embodiment, the values may be within 1% of each other. In other embodiments, the values may be within other percentages of one another, e.g., within 5%, within 10%, and so forth as desired, for example, depending upon the application.

The image may originate from any of a variety of sources. For example, in one embodiment of an industrial application, the image may be produced and acquired by a vision system, such as that described above with respect to FIG. 5, where an industrial camera takes a picture of an object, e.g., on a manufacturing assembly line, and sends the image data to a computer system, e.g., computer 82, where in some embodiments, the image may be processed as described herein, or, in other embodiments, the image may be sent to some other computer, e.g., over a network, for processing. Note that if the original image is not color-balanced, the image may be processed to balance the colors.

In one exemplary embodiment, the object may be at least a portion of a dashboard display, e.g., a dashboard circuit board, where LEDs of various colors are used to indicate system states, e.g., turn signal indicators, etc.

Figure 7:
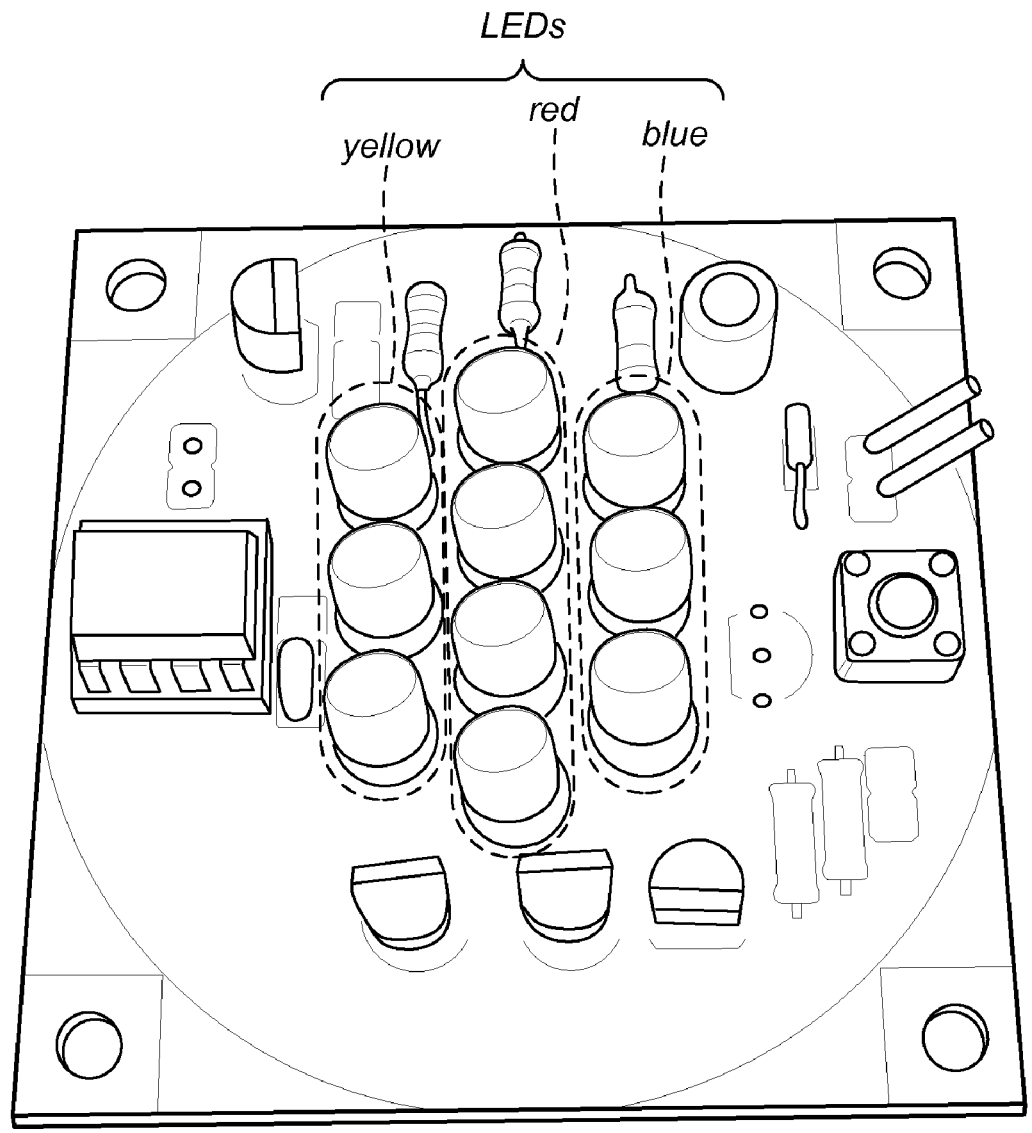
FIG. 7 illustrates a color-balanced image, according to one embodiment.

FIG. 7 illustrates a color-balanced image of an exemplary circuit board with multiple LEDs of different colors, including a column of 3 green LEDs (left), a column of 4 red LEDs (middle), and a column of 3 blue LEDs (right).

In 604, an indication of a region of interest may be received, where the region of interest includes one of the one or more lit areas. In other words, a portion of the image may be specified or indicated, e.g., via user input or programmatically. For example, in one embodiment, a user may specify the region of interest (ROI) by dragging a mouse over a display of the image. In another embodiment, an image analysis program may be used to programmatically detect and localize or indicate the ROI. The particular manner in which the ROI is indicated is not important, i.e., any approach may be used as desired.

In 606, a mask image may be generated based on the ROI. For example, the mask image may be created by setting every pixel value within the region of interest to white and every other pixel to black. Thus, the mask image implements a "window" corresponding to the ROI, where the rest of the image is obscured.

In one embodiment, generating the mask image based on the region of interest may include generating a binary image from the color-balanced image, e.g., by generating a grayscale image from the color-balanced image, and generating the binary image from the grayscale image based on a specified threshold.

For example, an initial mask image may be generated based on the region of interest, then, the mask image may be generated based on the initial mask and the binary image. In other words, in one embodiment, a grayscale intensity (e.g., luminosity or luminance) image may be extracted from the color image. The grayscale image may then be thresholded to provide a binary, e.g., black and white, image. The binary image and the initial mask image may then be combined, e.g., ANDed, to generate the mask image.

Figure 8:
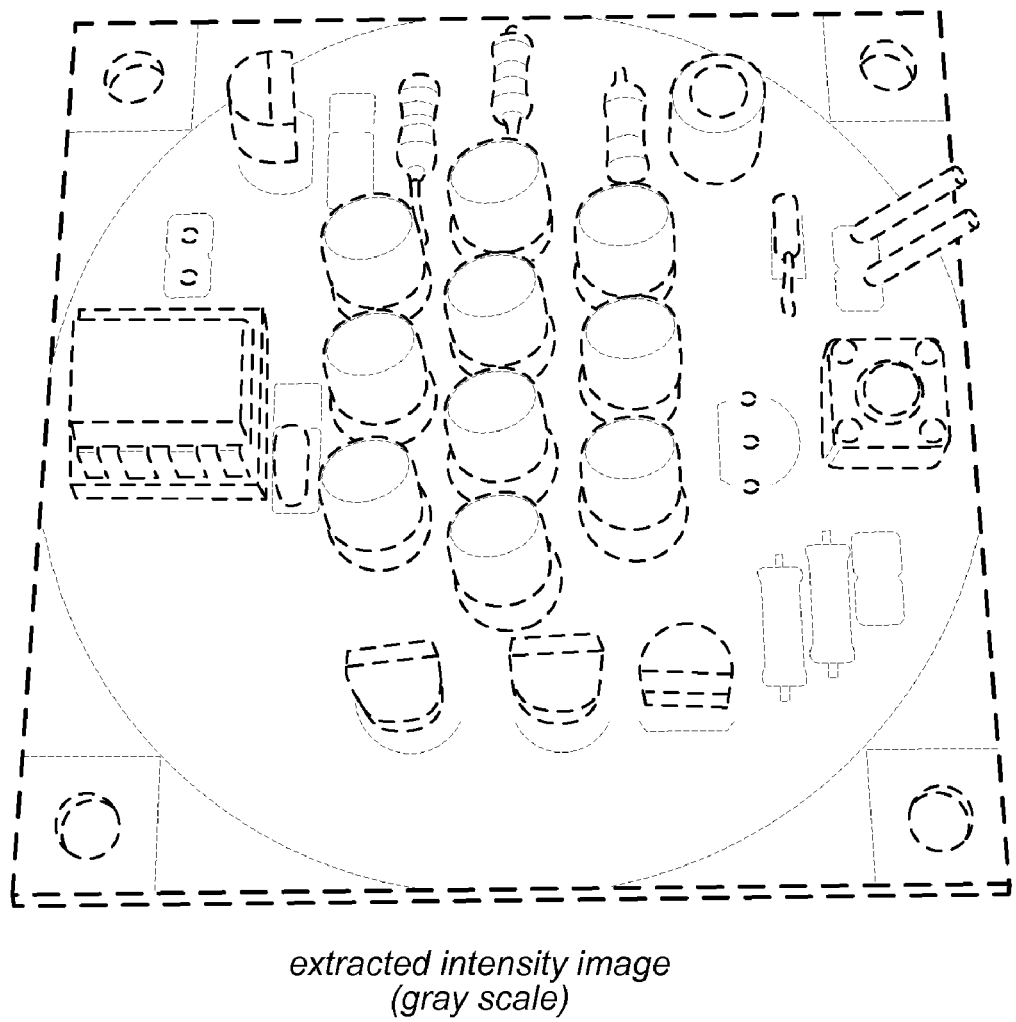
FIG. 8 illustrates a grayscale (intensity) image based on the color-balanced image of FIG. 7, according to one embodiment.
Figure 9:
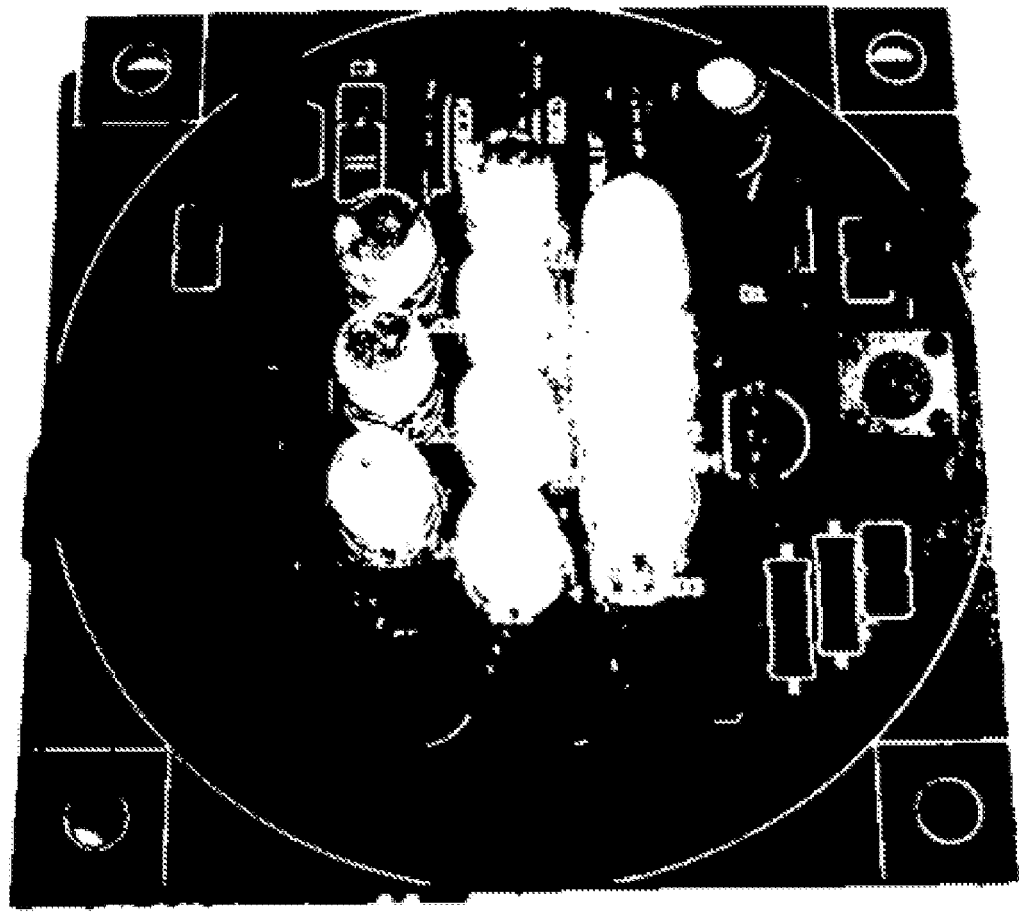
FIG. 9 illustrates a binarized image based on the grayscale image of FIG. 8, according to one embodiment.
Figure 10:
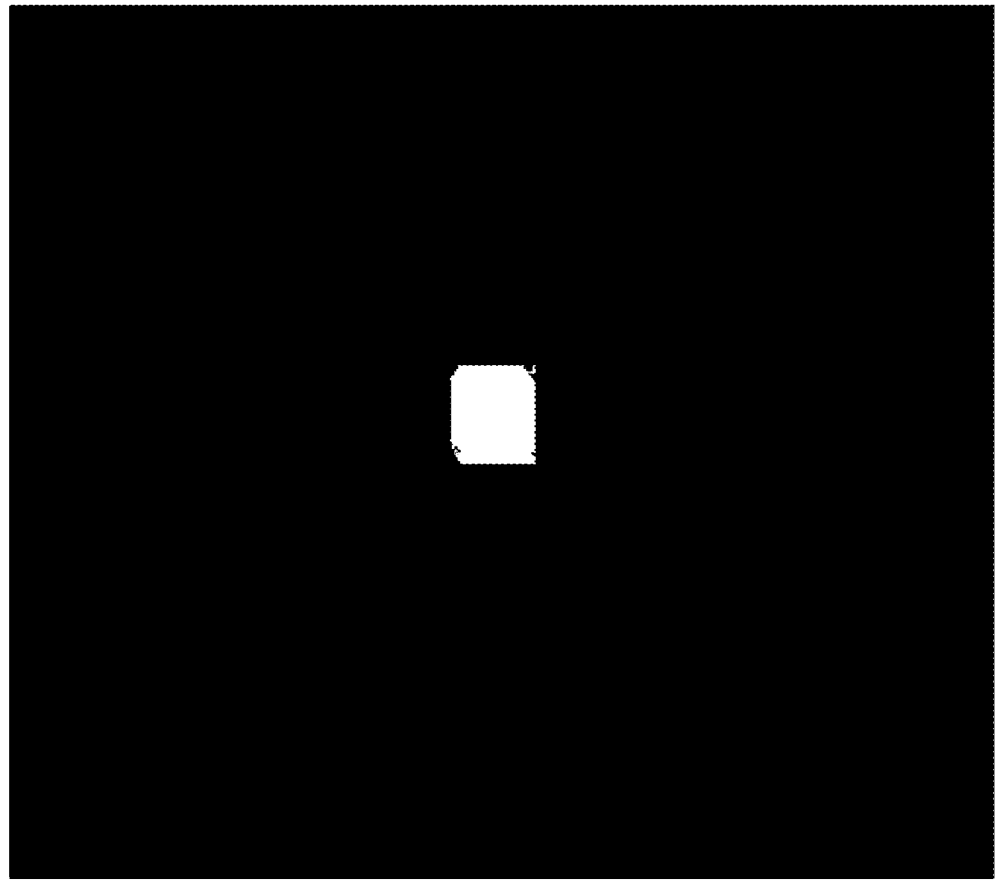
FIG. 10 illustrates an exemplary mask image generated from the binarized image of FIG. 9, according to one embodiment.

FIG. 8 illustrates an exemplary grayscale image derived from or created based on the color-balanced image of FIG. 7. FIG. 9 illustrates an exemplary binary image generated from the grayscale image of FIG. 8. In one embodiment, the threshold level may be set such that only the lit areas of the LED are visible in the region of interest, although in other embodiments, this condition may only be met approximately, i.e., may be approached, but not met, as is the case with FIG. 9. FIG. 10 illustrates an exemplary mask image. As may be seen, this mask image masks everything but the ROI, and the ROI region or window of the mask is binary. In other words, the color values of the mask image are either 1 (ROI region or window) or 0 (the rest of the mask image).

Figure 11:
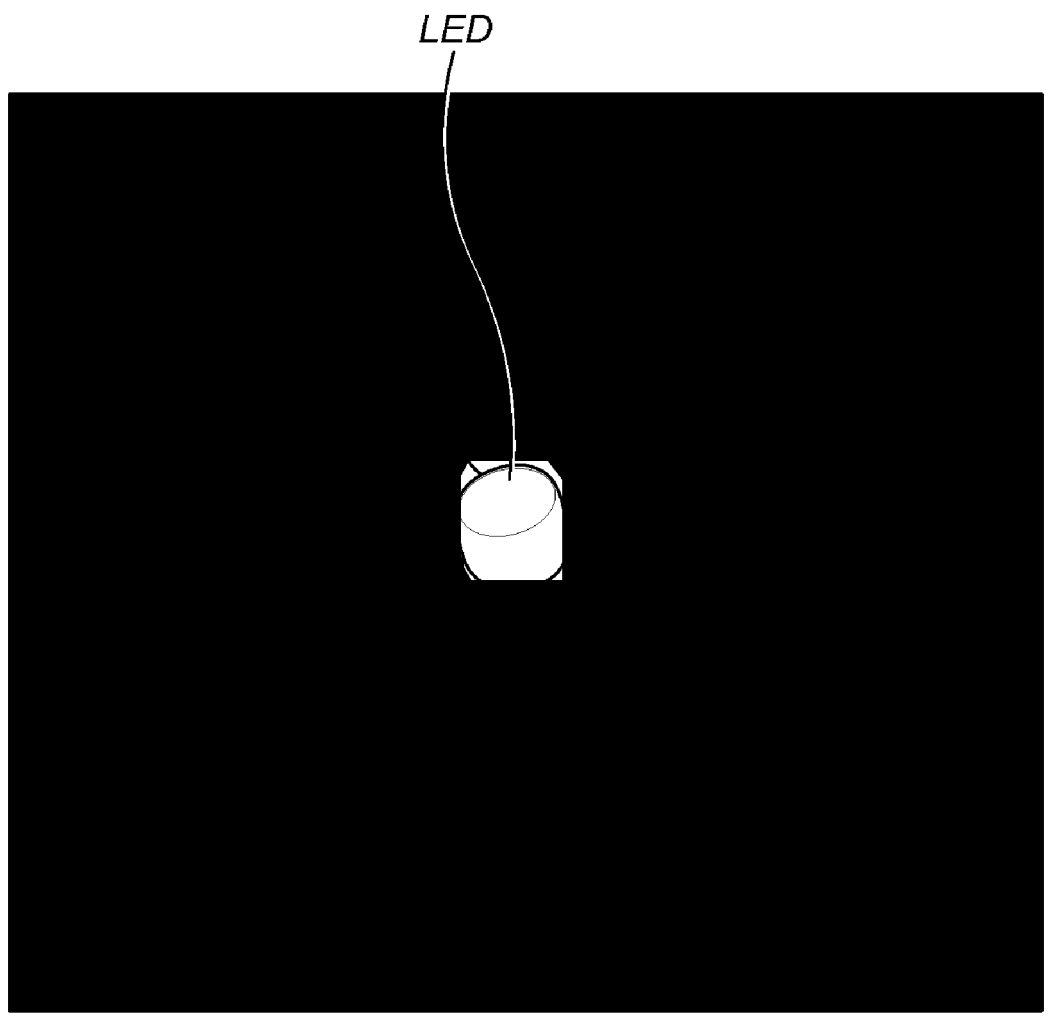
FIG. 11 illustrates a color-balanced image of the region of interest generated from the images of FIGS. 7 and 10, according to one embodiment.

In 608, a color-balanced image of the region of interest may be generated by masking the color-balanced image with the mask image. In other words, the original (color-balanced) image may be masked with the thresholded image, e.g., resulting in only the interesting color area (the ROI) of the color-balanced image remaining and the rest of the image being set to black. FIG. 11 illustrates an exemplary color-balanced image of the region of interest generated from the images of FIGS. 7 and 10. Note that the non-black part of the image is that portion of the color-balanced image of FIG. 7 defined or specified by the ROI.

Thus, the above method elements may generate an isolated ROI of the color-balanced image that is suitable for color analysis.

In 610, a plurality of image attributes for the region of interest may be determined by analyzing the color-balanced image of the region of interest. For example, in one embodiment, analyzing the color-balanced image of the region of interest may include computing a histogram on the color-balanced image of the region of interest, and determining the plurality of attributes based on the histogram.

In some embodiments, the plurality of image attributes for the region of interest may include attributes with respect to multiple color planes. For example, the image attributes may include average value, minimum value, maximum, and standard variation for each of red, green, blue, hue, saturation, and intensity color planes. In other words, the average value, minimum value, maximum, and standard variation may be determined for both the RGB (Red, Green, Blue) color planes, and the HSI (Hue, Saturation, and Intensity) color planes. It should be noted, however, that in other embodiments, other color models/color planes may be used as desired.

Thus, in one embodiment, a histogram may be produced with respect to the color-balanced image of the region of interest, and based on the histogram, the average value, the minimum value, the maximum value and the standard variation determined for each of the red, green and blue color planes, and the same operation may be carried out with respect to the HSI (hue, saturation and intensity) color planes, thus producing 24 values that characterize the color-balanced image of the region of interest. Note, however, that in other embodiments, other attributes may be determined as desired.

Table 1 presents exemplary histogram values for the color-balanced image of the region of interest, specifically, two or more of: the minimum value, the maximum value, the starting value, the interval width, the average (mean) value, the standard variation, and area in pixels, determined for each of the red, green, blue, hue, saturation, and intensity color planes.

TABLE 1

Histogram Values for the Masked Color Image

|  | Red | Green | Blue | Hue | Saturation | Intensity |
|---|---|---|---|---|---|---|
| Minimum Value | 0 | 0 | 0 | 0 | 0 | 0 |
| Maximum Value | 255 | 255 | 255 | 255 | 255 | 248 |
| Starting Value | 0 | 0 | 0 | 0 | 0 | 0 |
| Interval Width | 1 | 1 | 1 | 1 | 1 | 1 |
| Mean Value | 218.747055 | 101.302185 | 144.3704 | 242.847229 | 199.778625 | 155.687286 |
| Standard Deviation | 73.413765 | 56.176807 | 56.45618 | 19.332262 | 74.78698 | 54.504627 |
| Area (pixels) | 2376 | 2376 | 2376 | 2376 | 2376 | 2376 |

In 612, a color may be determined based on the plurality of image attributes using a trained classifier. More specifically, the 24 attribute values determined in 610 may be provided to the trained classifier as input, and the classifier may return a color classification for the (color-balanced image of the) ROI. Moreover, in one embodiment, determining the color may further include determining a confidence value for the color using the trained classifier. The confidence value may indicate a degree to which the determined color matches the color of the lit area in the region of interest. Thus, while the classifier may always determine a color, the confidence value, i.e., the measure of how good the color classification is, may be used to determine if the classification is valid, or, conversely, if an invalid color has been detected.

In 614, the determined color, i.e., the color classification, may be stored. Note that the color classification may be used for any of a variety of purposes. For example, in one exemplary embodiment, the image includes an image of an object, e.g., a manufactured object to be tested for quality assurance, where the image is received from an image acquisition device in an industrial process. The determined color may then be used to analyze the object. For example, in the dashboard circuit application mentioned above, the color classification may be used to determine whether the LED in the ROI is of the right color and/or is operating properly.

The above method elements may be performed with respect to other ROIs as well. For example, regarding the exemplary dashboard circuit of FIG. 7, the method may be used to analyze each of the LEDs in the circuit. Of course, the determined color(s) may be used in any manner and for any applications desired.

In some embodiments, the method may further include performing one or more operations with respect to the object based on the analysis of the object, e.g., indicating or removing the object if it fails to meet quality requirements, etc., as desired.

Training the Classifier

In one embodiment, the method may include training the classifier. The training process may be similar in some ways to the classification method described above, but with the classifier in a training mode, rather than a classification mode.

For example, in one embodiment, training the classifier may include receiving a control image that includes at least one lit area of each color to be classified. In other words, the control image should include example illuminated areas of each color for which the classifier is to be able to classify. Then, for each color to be classified, the lit or illuminated area of the color may be analyzed, and a respective plurality of attributes for the region of interest may be determined with respect to the color based on the analyzing. In some embodiments, the respective plurality of attributes includes the average value, minimum value, maximum, and standard variation with respect to each of red, green, blue, hue, saturation, and intensity color planes, similar to the attributes discussed above with reference to 610. Note, however, that in other embodiments, other attributes may be determined as desired.

Also similar to the classification process described above, in some embodiments, analyzing the lit area of the color may include computing a histogram with respect to the lit area, where determining the respective plurality of attributes for the region of interest based on the analyzing includes determining the respective plurality of attributes based on the histogram.

Once the respective plurality of attributes are determined for each color, the classifier may be trained with respect to each color using the plurality of attributes and respective identifiers for the colors to the classifier as training input. In other words, the attributes for each color and a corresponding color identifier, e.g., name, code, symbol, etc., for each color may be provided to the classifier as training input, and the classifier may be trained accordingly to associate each color identifier with the associated set of attributes.

Note that the classifier may be of any type desired, e.g., a neural network (e.g., a digital neural network), a support vector machine (SVM), a rule-based expert system, a statistical model, and so forth. Once the classifier is trained, embodiments of the above classification method may use the trained classifier to classify or distinguish colors in an image, e.g., to analyze or characterize illuminated objects in images.

Thus, embodiments of the above systems and methods may be used to distinguish between and classify colors of illuminated objects using machine vision.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A computer-implemented method for distinguishing colors of illuminated objects using machine vision, the method comprising:

receiving a color-balanced image that includes one or more lit areas, wherein the one or more lit areas display at least one colored illumination source;

receiving an indication of a region of interest, wherein the region of interest includes a first lit area of the one or more lit areas, wherein the first lit area displays a first colored illumination source;

generating a mask image based on the region of interest;

generating a color-balanced image of the region of interest by masking the color-balanced image with the mask image;

determining a plurality of image attributes for the region of interest by analyzing the color-balanced image of the region of interest;

determining a color classification of the first colored illumination source based on the plurality of image attributes using a trained classifier; and storing the determined color classification.

2. The method of claim 1, wherein said generating a mask image based on the region of interest comprises:

generating a binary image from the color-balanced image;

generating an initial mask image based on the region of interest; and generating the mask image based on the initial mask and the binary image.

3. The method of claim 2, wherein said generating a binary image from the color-balanced image comprises:

generating a grayscale image from the color-balanced image; and generating the binary image from the grayscale image based on a specified threshold.

4. The method of claim 1, wherein said analyzing the color-balanced image of the region of interest comprises:

computing a histogram on the color-balanced image of the region of interest; and determining the plurality of attributes based on the histogram.

5. The method of claim 1, wherein said determining a color classification further comprises:

determining a confidence value for the color classification using the trained classifier, wherein the confidence value indicates a degree to which the determined color classification matches the color of the first lit area in the region of interest; and wherein said storing further comprises storing the confidence value.

6. The method of claim 1, wherein the plurality of image attributes comprises attributes with respect to multiple color planes.

7. The method of claim 1, wherein the plurality of image attributes comprises two or more of:

average value, minimum value, maximum, and standard variation for each of red, green, blue, hue, saturation, and intensity color planes.

8. The method of claim 1, further comprising training the classifier, comprising:

receiving a control image, wherein the control image comprises at least one lit area of each color to be classified;

for each color to be classified, analyzing the lit area of the color; and determining a respective plurality of attributes for the region of interest with respect to the color based on said analyzing; and training the classifier with respect to each color using the plurality of attributes and respective identifiers for the colors to the classifier as training input.

9. The method of claim 8, wherein said analyzing the lit area of the color comprises computing a histogram with respect to the lit area, and wherein said determining the respective plurality of attributes for the region of interest based on said analyzing comprises determining the respective plurality of attributes based on the histogram.

10. The method of claim 8, wherein the respective plurality of attributes comprises two or more of: average value, minimum value, maximum, and standard variation with respect to each of red, green, blue, hue, saturation, and intensity color planes.

11. The method of claim 1, wherein the image comprises an image of an object, wherein the image is received from an image acquisition device in an industrial process, the method further comprising:

using the determined color classification to analyze the object.

12. The method of claim 11, the method further comprising:

performing one or more operations with respect to the object based on the analysis of the object.

13. A non-transitory computer readable memory medium that stores program instructions executable by a processor to perform:

receiving a color-balanced image that includes one or more lit areas, wherein the one or more lit areas display at least one colored illumination source;

receiving an indication of a region of interest, wherein the region of interest includes a first lit area of the one or more lit areas, wherein the first lit area displays a first colored illumination source;

generating a mask image based on the region of interest;

generating a color-balanced image of the region of interest by masking the color-balanced image with the mask image;

determining a plurality of image attributes for the region of interest by analyzing the color-balanced image of the region of interest;

determining a color classification of the first colored illumination source based on the plurality of image attributes using a trained classifier; and storing the determined color classification.

14. The non-transitory computer readable memory medium of claim 13, wherein said generating a mask image based on the region of interest comprises:

generating a binary image from the color-balanced image;

generating an initial mask image based on the region of interest; and generating the mask image based on the initial mask and the binary image.

15. The non-transitory computer readable memory medium of claim 14, wherein said generating a binary image from the color-balanced image comprises:

generating a grayscale image from the color-balanced image; and generating the binary image from the grayscale image based on a specified threshold.

16. The non-transitory computer readable memory medium of claim 13, wherein said analyzing the color-balanced image of the region of interest comprises:

computing a histogram on the color-balanced image of the region of interest; and determining the plurality of attributes based on the histogram.

17. The non-transitory computer readable memory medium of claim 13, wherein said determining a color classification further comprises:

determining a confidence value for the color classification using the trained classifier, wherein the confidence value indicates a degree to which the determined color classification matches the color of the first lit area in the region of interest; and wherein said storing further comprises storing the confidence value.

18. The non-transitory computer readable memory medium of claim 13, wherein the plurality of image attributes comprises attributes with respect to multiple color planes.

19. The non-transitory computer readable memory medium of claim 13, wherein the plurality of image attributes comprises two or more of:
- average value, minimum value, maximum, and standard variation for each of red, green, blue, hue, saturation, and intensity color planes.

20. The non-transitory computer readable memory medium of claim 13, wherein the program instructions are further executable to train the classifier, wherein training the classifier comprises:
- receiving a control image, wherein the control image comprises at least one lit area of each color to be classified;
- for each color to be classified,
  - analyzing the lit area of the color; and
  - determining a respective plurality of attributes for the region of interest with respect to the color based on said analyzing; and
- training the classifier with respect to each color using the plurality of attributes and respective identifiers for the colors to the classifier as training input.

21. The non-transitory computer readable memory medium of claim 20, wherein said analyzing the lit area of the color comprises computing a histogram with respect to the lit area, and wherein said determining the respective plurality of attributes for the region of interest based on said analyzing comprises determining the respective plurality of attributes based on the histogram.

22. The non-transitory computer readable memory medium of claim 20, wherein the respective plurality of attributes comprises two or more of: average value, minimum value, maximum, and standard variation with respect to each of red, green, blue, hue, saturation, and intensity color planes.

23. The non-transitory computer readable memory medium of claim 13, wherein the image comprises an image of an object, wherein the image is received from an image acquisition device in an industrial process, wherein the program instructions are further executable to perform:
- using the determined color classification to analyze the object.

24. The non-transitory computer readable memory medium of claim 23, wherein the program instructions are further executable to perform one or more operations with respect to the object based on the analysis of the object.

25. A system, comprising:
- a processor; and
- a memory medium coupled to the processor, wherein the program instructions are executable by the processor to:
  - receive a color-balanced image that includes one or more lit areas, wherein the one or more lit areas display at least one colored illumination source;
  - receive an indication of a region of interest, wherein the region of interest includes a first lit area of the one or more lit areas, wherein the first lit area displays a first colored illumination source;
  - generate a mask image based on the region of interest;
  - generate a color-balanced image of the region of interest by masking the color-balanced image with the mask image;
  - determine a plurality of image attributes for the region of interest by analyzing the color-balanced image of the region of interest;
  - determine a color classification of the first colored illumination source based on the plurality of image attributes using a trained classifier; and
  - store the determined color classification.

* * * * *